United States Patent [19]
Younkin

[11] 4,148,187
[45] Apr. 10, 1979

[54] RADIAL END BURNER ROCKET MOTOR

[75] Inventor: Harry A. Younkin, Newark, Del.

[73] Assignee: Hercules Incorporated, Wilmington, Del.

[21] Appl. No.: 739,388

[22] Filed: Nov. 5, 1976

[51] Int. Cl.² .............................................. F02K 9/04
[52] U.S. Cl. ...................................... 60/245; 60/250; 60/254; 102/101
[58] Field of Search ................ 60/253, 254, 245, 250; 102/101

[56] References Cited

U.S. PATENT DOCUMENTS

| | | | |
|---|---|---|---|
| 3,052,092 | 9/1962 | Kirkbride | 60/250 |
| 3,064,423 | 11/1962 | Frey | 60/253 |
| 3,120,737 | 2/1964 | Holloway | 60/250 |
| 3,292,545 | 12/1966 | Matsubara | 102/101 |

Primary Examiner—Robert E. Garrett
Attorney, Agent, or Firm—Joshua W. Martin, III

[57] ABSTRACT

A rocket motor grain consisting of a one-piece solid base propellant divided into an aft end section having a central cavity extending throughout its length, a forward end section having a central longitudinal cavity filled with a propellant having a substantially higher burning rate than the base propellant and a central web section being defined between the forward and aft end sections. This radial end burning rocket motor grain provides a means for utilizing high energy and high density propellants which have high burning rates in a manner such that the burning rate effects can be offset to provide enhanced motor performance without the sacrifice of high energy. After initiation of the rocket motor grain, the aft end section and central web section begin burning together to provide the desired mass flow rate, followed by initiation of a higher burning rate propellant in the forward section. Thereafter, the higher burning rate propellant, being consumed at a much higher rate than the base propellant of the forward section, forms a cylindrical radial burning port therein, thereby extending the motor burn time.

8 Claims, 10 Drawing Figures

RADIAL END BURNER ROCKET MOTOR

This invention relates generally to rocket propellants and more particularly to a method of improving the performance of high energy, diameter-limited upper stage solid propellant rocket motors through the use of a combination of high energy propellants and a unique grain configuration.

The diameter of a solid propellant rocket motor is usually limited by such factors as the diameter of previous stages in a multi-stage vehicle, length to diameter limitations set by stiffness requirements, and other envelope restrictions defined by the configuration specification for the specific rocket motor.

In the optimization of a diameter limited solid propellant rocket motor for upper stage application, it is desirable to use the highest impulse and density propellant available to obtain maximum range or delta velocity performance. Also, associated many times with optimum performance in a diameter-limited rocket system is the need for a propellant with low burning rate (r=0.2 to 0.3 in./sec.) and low burning rate exponent (n=0.3 to 0.5) characteristics. The burning rate and burning rate exponent are related by the common burning rate equation in general form:

$$r = cp^n,$$

where "r" represents the burning rate, "c" represents the burning rate constant, "p" represents the pressure at which the propellant is burning and "n" represents the burning rate exponent.

The use of a low burning rate propellant in a center-ported grain provides for a low mass flow rate and long burn time which allows use of a nozzle with a relatively small throat and high expansion ratio, thus increasing motor delivered specific impulse and performance. Unfortunately, in high impulse and high density propellants (I°sps≧265, density≧0.065 lb./in. respectively), the range of burning rate and slope are usually between 0.4 to 1.0 in./sec. at 1000 p.s.i.a. and 0.5 to 0.7, respectively. This range of high burning rates generally causes a shorter burn time, higher mass flow rate and, in turn, requires the use of a lower expansion ratio nozzle, resulting in decreased motor performance, thereby negating the advantages of high impulse and high propellant density. Therefore, a compromise between energy level and ballistic rate parameters must be made to select the propellant and design parameters for the rocket motor. In many cases, some improvement in performance has been realized from conventionally designed, diameter-limited, center-ported motors by selection of a lower energy, lower rate propellant due to the desirable burning rate effects, while the advantages of high energy, high density propellants have not been utilized.

This invention provides a means for utilizing high energy and high density propellants which have high burning rates in a manner such that the burning rate effects can be offset to provide enhanced motor performance without the sacrifice of high energy. This invention utilizes the higher burning rate of high energy and high density propellant in a grain configuration which basically consists of a one-piece solid base propellant having a ported aft end section, a solid central section and a solid forward end section containing a small end burning core, wherein the core is comprised of a propellant having a substantially higher burning rate than the base propellant. The small high rate core upon being ignited, burns out quickly establishing a port in the forward section, converting it to a radial burning sliverless configuration, thereby providing a much larger effective propellant web than obtainable with a conventional radial burning center-ported configuration extending the full length of the grain. The larger web permits a reduction in the mass flow rate of the propellant combustion gases over the mass flow rate which would be obtained with a high energy propellant having a conventional center-ported configuration. With the reduced mass flow rate, the nozzle throat diameter can be smaller, permitting a higher expansion ratio nozzle to be used with the result that higher impulse is delivered.

The radial end burner grain of this invention provides for the overall propellant mass to be divided, conceptually, into interacting segments of burning web and burning surface. According to the present invention, a grain is provided having a design expecially adapted for utilizing the significantly higher burning rates of high energy, high density propellants in a manner such that the rate effects can be offset by effectively increasing the propellant web to provide for longer burn time, lower mass flow rate and large expansion ratio nozzle performance characteristics, as obtained with a low rate propellant, without sacrificing any available propellant energy. This radial end burner grain, therefore, provides for a motor design in which the highest energy propellant can be combined with the optimum ballistics design characteristics to obtain the highest performance possible for high energy diameter-limited upper stage applications. In addition, with the subject invention, the stress relief system and insulation requirements for an assembled motor employing the propellant grain of this invention are minimized, since the full motor length does not require the heavy insulation or stress relief normally required with a conventional end burner. Thus, the penalty in performance resulting from use of a conventional end burner, due to increased inert weight and reduced propellant weight, is minimized.

It is an object of this invention to provide improved motor performance for upper stage solid propellant rocket motors through utilization of high energy propellants having high burning rates and unique grain configurations, thereby achieving optimum ballistic parameters.

Another object is to provide a grain design which effectively increases the propellant burning web and burning time beyond that obtainable in a conventional, center-ported grain using the same propellant.

A further object is to provide a grain design in which a propellant web is effectively increased by separating, conceptually, the base propellant grain into a ported aft end section, a central web section and an initially end burning forward section such that the surface-distance relationship of the sections, when ignited and burning together, will provide the desired mass flow rate and burning time, thereby permitting optimization of nozzle expansion ratio parameters.

Other objects and advantages of this invention will be apparent from the following detailed description and the drawings.

In accordance with this invention, a radial end burner grain is provided, said radial end burner grain comprising: a one-piece, solid base propellant having a cylindrical external configuration; said base propellant having a forward end section, central web section and aft end section; said aft end section having a central longitudinal cavity extending throughout the length of the aft end section; said forward end section having a central, longitudinal cavity extending throughout the length of said forward end section, said cavity being filled with a solid propellant having a substantially higher burning rate than the burning rate of the base propellant; said central web section being defined between the forward end section and aft end section of said solid base propellant, said central web section being that part of the base propellant having a continuous circular cross-sectional area.

The drawings which follow further illustrate this invention. In the drawings, like numbers refer to like parts where applicable.

Figure 1:
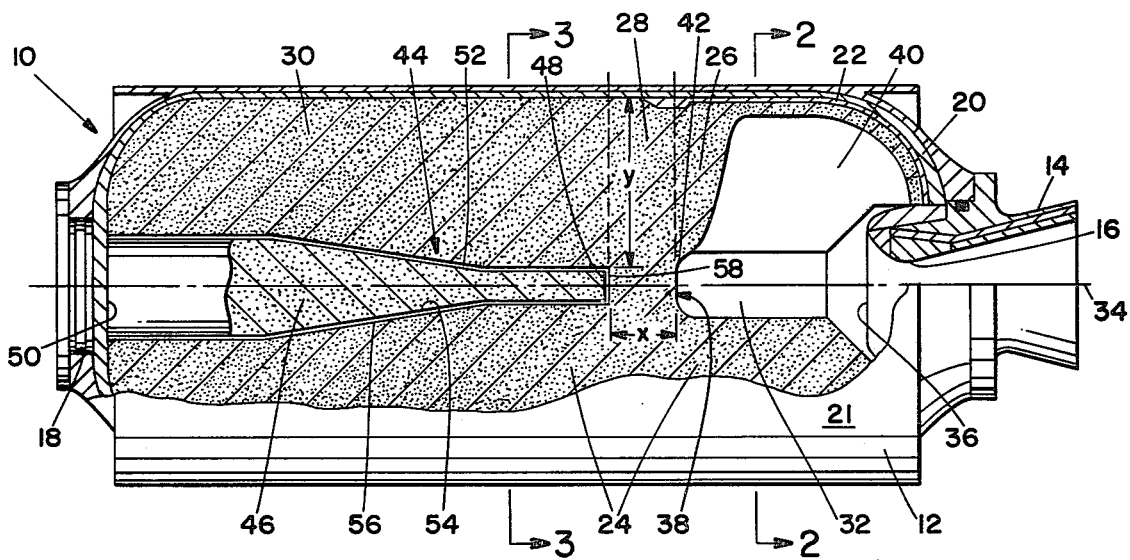
FIG. 1 is a longitudinal, part sectional and part elevational view of one embodiment of the radial end burner grain of this invention.
Figure 2:
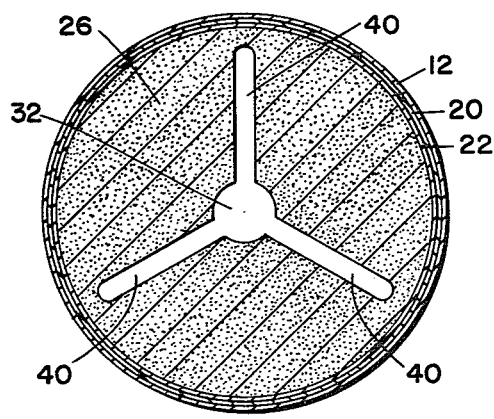
FIG. 2 is a cross-sectional view taken along section line 2—2 of FIG. 1.
Figure 3:
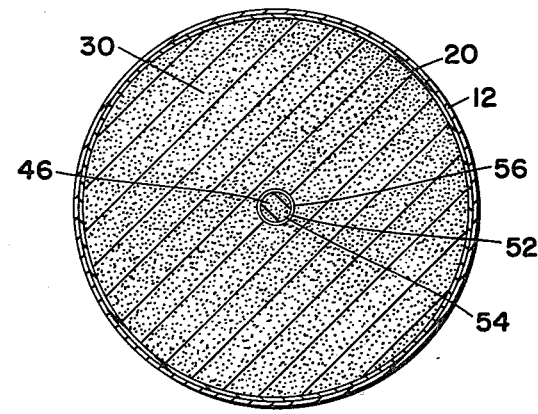
FIG. 3 is a cross-sectional view taken along section line 3—3 of FIG. 1.

Referring now to the drawings, as shown in FIG. 1, the radial end burner grain of this invention is adapted to a rocket motor 10 having a composite material case 12, a conventional nozzle 14 having throat section 16, and forward end closure 18. The composite material case 12 contains an inner layer of insulation 20 and aft portion 21 of case 12 has a stress relief liner 22 located within insulation layer 20. One-piece, solid base propellant grain 24, having a cylindrical external configuration, completely fills, and has its external surface contiguous with, the interior of case 12. For convenience of description, the propellant grain 24 is described as being divided into three sections; an aft end section 26, a central web section 28, and a forward end section 30. The aft end section 26 contains a cylindrical centrally disposed port 32, which is a cylindrical cavity situated along the longitudinal axis 34, and extending from the base 36 of nozzle 14 to forward surface 38. Aft end section 26 contains slots 40 as shown also in FIG. 2, which intersect central port 32 and extend outwardly toward stress relief liner 22. Forward of aft end section 26 and continuous therewith is central web section 28, which has a continuous circular cross section. The common surface formed by intersection of a part of the aft surface of central web section 28 and forward surface 38 of aft end section 26 is initiation area 42. Forward of central web section 28 is forward end section 30, having therein, central cavity 44 extending throughout the length of forward end section 30. In this preferred embodiment, central cavity 44 is completely filled with high energy, high burning rate, end-burning propellant 46. This cavity, filled with propellant 46, hereinafter referred to as propellant core 46, extends forward from its aft surface 48 throughout the entire length of forward end section 30. Propellant core 46 is tapered throughout a part of its length, said tapering part having the shape of a truncated cone. In this preferred embodiment the core 46 taper increases from aft surface 48 to the forward surface 50 of forward end section 30. The bonding interface 52 between the outer surface 54 of propellant core 46 and the annular interior surface 56 of forward end section 30, along with forward end area 58 of central web section 28 is sufficient to transfer stresses between propellant core 46 and propellant grain 24.

Solid base propellant grain 24 and high burning rate propellant core 46 may consist of the same type or of a different type of propellant. Applicable propellant types include double base and composite modified double base type propellants. Formulation changes and/or the addition of chemical or mechanical burning rate adjuvants may be used to provide the required difference in burning rates between propellant grain 24 and propellant core 46.

The burning rate of propellant core 46 is substantially higher than the burning rate of the base propellant of propellant grain 24, and preferably the burning rate for the high rate propellant core is generally from 2 to 25 times greater than the burning rate of the base propellant.

The effective web of the radial end burner of this invention is established by the summation of the distance from the initial burn surface to the high rate core, (X), plus the radial web distance, (Y), of the base propellant from the propellant core 46 as shown in FIG. 1. The initial distance (X) is equivalent to the thickness of central web section 28. Therefore, this effective web distance exceeds that radial web which could be obtained with a propellant grain having the same outside diameter, employing a conventional center-ported grain configuration and utilizing the same base propellant.

Initiation of the radial end burner grain in rocket motor 10 is effected by one or more ignitors placed within the central port 32 of aft end section 26 in proximity to initiation area 42 and within slots 40 (see FIG. 2) in proximity to the base propellant of aft end section 26.

Figure 4:
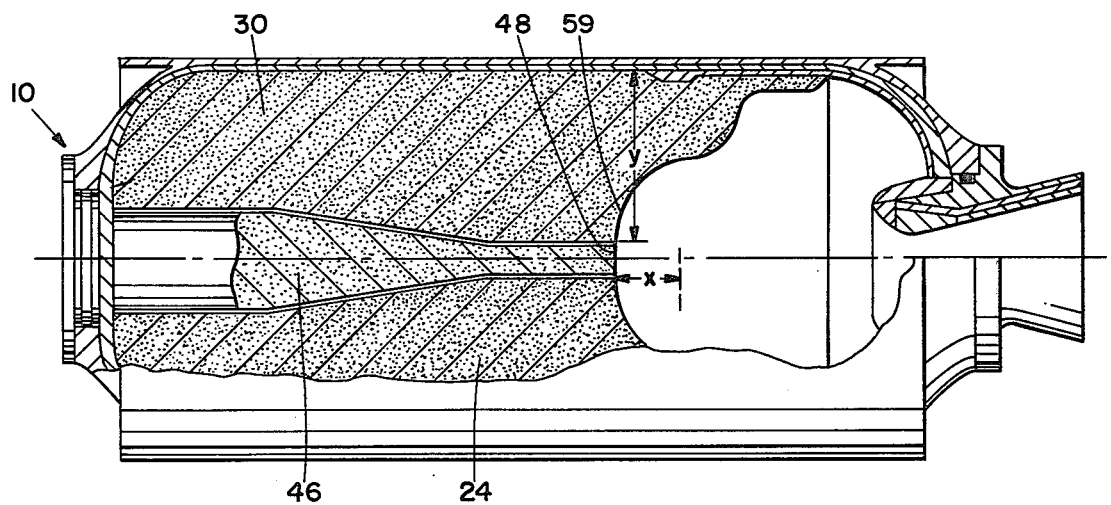
FIG. 4 is a longitudinal view partly broken away and partly in section of the preferred embodiment of the invention showing the burn surface at ignition of the high rate propellant core.
Figure 5:
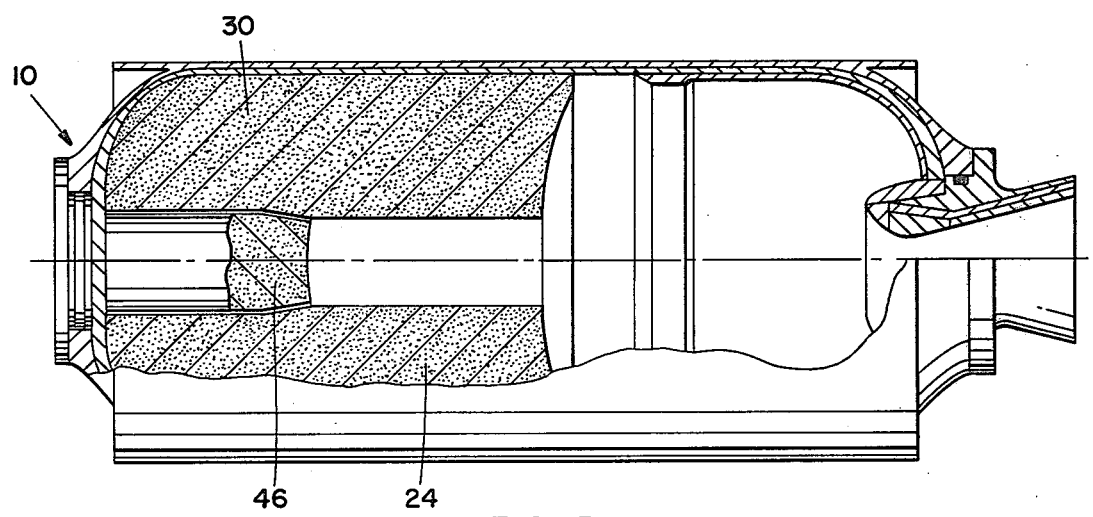
FIG. 5 is a longitudinal view partly broken away and partly in section of the preferred embodiment of the invention showing the burn surface when the high rate core is partially consumed.

The radial end burner grain burns in a rocket motor in the following manner to extend motor burn time, i.e., time to consume propellant web. The grain is first initiated and after initiation, aft end section 26 and central web section 28 of base propellant grain 24 begin burning together, thereby producing the desired mass flow rate. As base propellant is consumed, burning web distance (X) progresses, until high rate end burning propellant core 46 is ignited at aft surface 48. FIG. 4 shows the propellant burn surface 59 at time of ignition of propellant core 46. Propellant core 46 is consumed at a much higher rate than the base propellant of forward end section 30, thus forming a cylindrical radial burning port in forward end section 30 as shown in FIG. 5, where high rate propellant core 46 is partially consumed.

In this preferred embodiment, propellant core 46, being tapered, offsets the difference in burning rate between the high rate propellant core 46 and base propellant grain 24 such that a cylindrical port configuration is formed in forward end section 30 upon burn-out of high rate propellant core 46.

Figure 6:
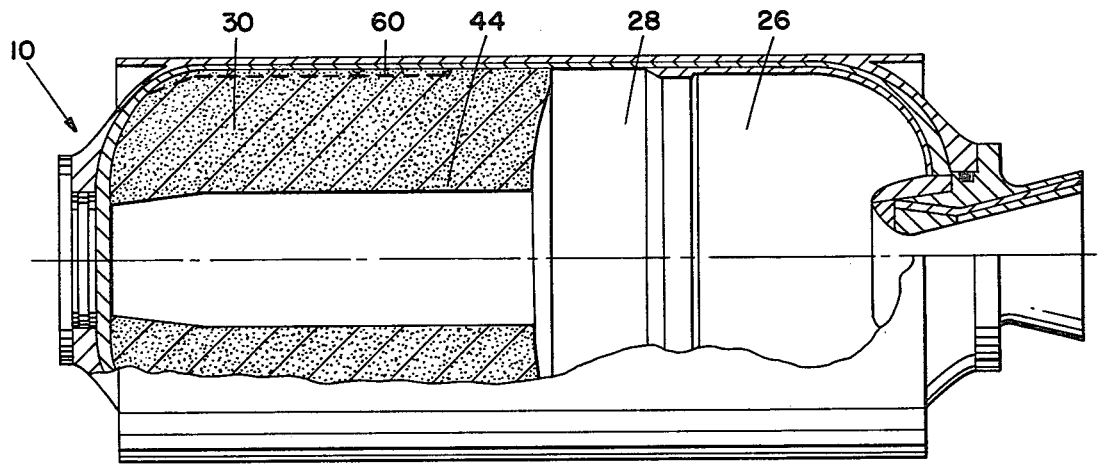
FIG. 6 is a longitudinal view partly broken away and partly in section of the preferred embodiment of the invention showing the burn surface configuration after the high rate core is totally consumed.

FIG. 6 shows the rocket motor 10 after propellant core 46 which originally filled central cavity 44 has been consumed, rendering forward end section 30 a radial burning section. In addition, FIG. 6 shows that the propellant in aft end section 26 along with the propellant in central web section 28 has been consumed, while the propellant in forward end section 30 continues to produce the desired mass flow. As burning of the base propellant in forward end section 30 continues, final burn surface 60 is reached, which occurs in forward end section 30 as shown in FIG. 6 to provide a sliverless tail-off characteristic. In this embodiment, the burning rate of propellant core 46 is preferably between about 2 and about 10 inches per second at 1000 p.s.i., while burning rate is between about 2 to about 25 times greater than the burning rate of the base propellant.

Figure 7:
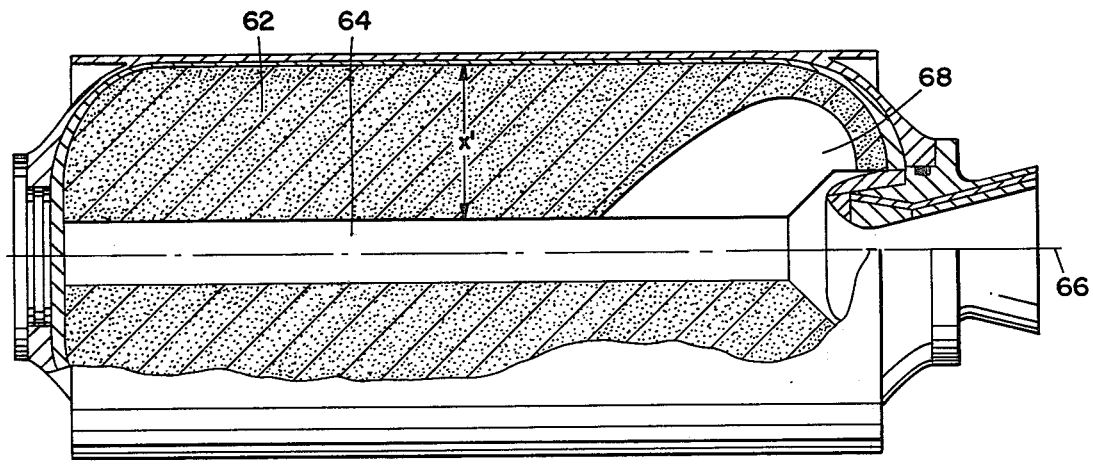
FIG. 7 is a longitudinal sectional view of a conventional center-ported rocket motor grain, illustrating prior art.

A typical conventional center-ported motor is depicted in FIG. 7. The propellant grain configuration is a one-piece solid mass of propellant 62 having a cylindrical external configuration and containing a cylindrical cavity 64 centered around the motor center-line 66 extending the length of the motor. Longitudinal slots 68 or other means may extend from the center port cavity into the propellant mass to tailor the burning surface for the desired ballistic characteristics. The web distance (X') being defined as the radial distance from the center port surface to the outside diameter of the propellant grain. Since burning time is web divided by burning rate and the mass flow rate is obtained from the total weight of the mass of propellant divided by the burning time, it can readily be seen that the propellant web distance has a large effect on establishing the ballistic and performance parameters for a given rocket motor.

With the instant invention, the reduced mass flow rate which is accomplished through reduced burning surface at a given time and increased burning time coupled with the base propellant rate, allows for use of a nozzle with a smaller throat and higher expansion ratio, thus providing higher delivered specific impulse and an overall motor performance increase.

Figure 8:
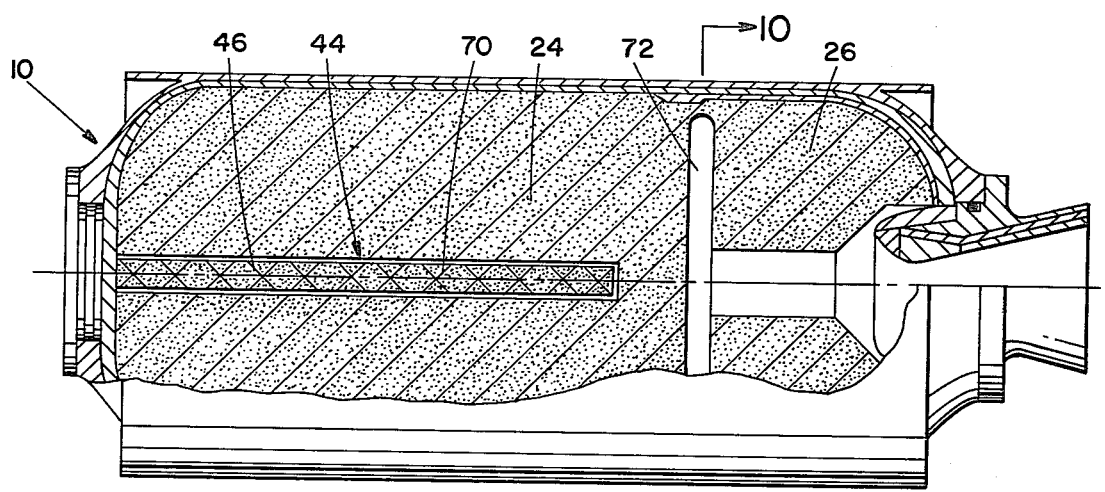
FIG. 8 is a longitudinal view partly broken away and partly in section, illustrating another embodiment of this invention.
Figure 10:
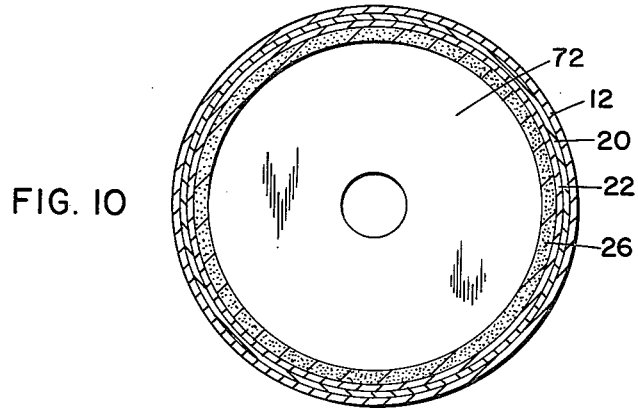
FIG. 10 is a cross-sectional view taken along section lines 10—10 of FIGS. 8 and 9, showing a substantially full diameter radial slot.

Another embodiment of the invention is shown in FIG. 8, where central cavity 44 contains propellant core 46 comprising an ultra-high burning rate, i.e., deflagrating pyrotechnic fuse material 70. A substantially full-diameter radial slot 72 in aft end section 26, also shown in FIG. 10, is used to provide the necessary stress relief.

Figure 9:
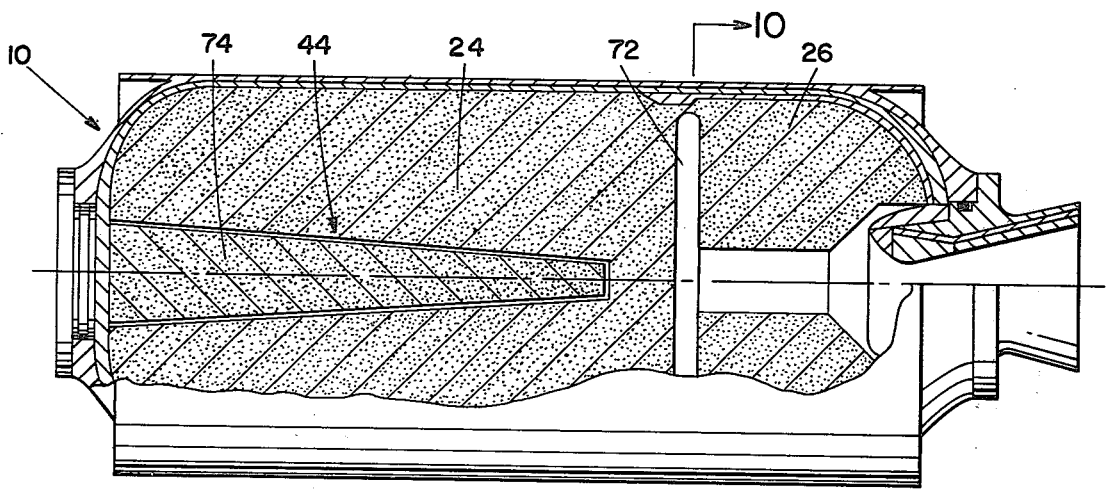
FIG. 9 is a longitudinal view partly broken away and partly in section, illustrating still another embodiment of this invention.

FIG. 9 shows still another embodiment of the invention utilizing tapered high rate propellant core 74 within central cavity 44 in combination with lower burning rate base propellant grain 24 and substantially full-diameter radial slot 72 in aft end section 26. Radial slot 72 is also shown in FIG. 10.

These embodiments of the invention indicate several burning rate combinations and high rate propellant core geometries that can be used to obtain rate and ballistic relationships desired for specific rocket motor performance. In particular, the relationships can be tailored to provide the desired ballistic trace and burn-out tail-off characteristics.

The radial end burner grain of this invention provides for a motor with high mass fraction, high volumetric loading fraction, sliverless tail-off characteristics and low pressure and thrust neutrality capability, as well as a technique for using high energy, high rate propellants to obtain the increased expansion ratio and performance effects of a low rate propellant without sacrificing the high energy and high density of the high rate propellant.

Through the delayed consumption of the forward end section of the propellant of this invention, the total effective burning web of propellant is increased and the mass flow rate reduced in comparison to a conventional full length center-ported motor of the same total propellant mass having a shorter web and using a base propellant having the same burning rate. Thus, a higher expansion ratio nozzle can be employed with the result that higher impulse can be delivered.

As will be evident to those skilled in the art, various modifications can be made in the light of the foregoing disclosure and discussion, without departing from the spirit or scope of the disclosure or from the scope of the claims.

What I claim and desire to protect by Letters Patent is:

1. A solid propellant rocket motor grain comprising:
   a one-piece, solid base propellant having a cylindrical external configuration;
   said base propellant having a forward end section, a central web section and an aft end section;
   said aft end section having a central longitudinal cavity extending throughout the length of the aft end section;
   said forward end section having a single, central, longitudinal cavity extending throughout the entire length of said forward end section, wherein a part of said cavity in said forward end section has the shape of a truncated cone, with taper of said core increasing from the aft end to the forward end of said forward end section, said cavity in said forward end section being filled with solid propellant continuously throughout the entire length of said cavity, said solid propellant in said forward end section cavity having a substantially higher burning rate than the burning rate of said base propellant;
   said central web section being defined between said forward end section and said aft end section of said solid base propellant, said central web section being that part of the base propellant having a continuous circular cross-sectional area.

2. The solid propellant rocket motor grain of claim 1 wherein said aft end section has at least one slot spaced from the aft end of said aft end section extending radially from the longitudinal axis of said aft end section into the base propellant of said aft end section.

3. The solid propellant rocket motor grain of claim 1 wherein the solid propellant filling said cavity within said forward end section has a burning rate between about 2 to about 10 inches per second at 1000 p.s.i.a.

4. The solid propellant rocket motor grain of claim 1 wherein the solid propellant filling said cavity within said forward end section is an ultra-high burning rate, deflagrating pyrotechnic fuse.

5. The solid propellant rocket motor grain of claim 1 wherein the solid propellant filling said cavity within said forward end section has a burning rate between about 2 to about 25 times greater than the burning rate of said base propellant and said aft end section and said central web section are separated by a substantially full diameter radial slot.

6. The solid propellant rocket motor grain of claim 1 wherein the solid propellant filling said cavity within said forward end section has a burning rate between about 2 to about 25 times greater than the burning rate of said base propellant and a plurality of axial slots is provided, said slots extending from the periphery of and in communication with a central longitudinal cylindrical cavity of said aft end section, into the base propellant of said aft end section and toward the periphery thereof.

7. A solid propellant rocket motor comprising:
 a cylindrical combustion chamber having a closed forward end and an open aft end;
 a nozzle attached to the aft end of said combustion chamber;
 a one-piece solid base propellant having a cylindrical external configuration, located within said combustion chamber;
 said base propellant having a forward end section, central web section and aft end section;
 said aft end section having a central cavity extending throughout the length of the aft end section and having at least one slot spaced from the aft end of said aft end section extending radially from the longitudinal axis of said aft end section into the base propellant of the aft end section;
 said forward end section having a central, longitudinal cavity extending throughout the length of said forward end section, wherein a part of the cavity in said forward end section has the shape of a truncated cone, with taper of said cone increasing from the aft end to the forward end of said forward end section, said cavity in said forward end section being filled with solid propellant having a substantially higher burning rate than the burning rate of the base propellant;
 said central web section being defined between the forward end section and aft end section of said solid base propellant, said central web section beng that part of the base propellant having a continuous circular cross-sectional area.

8. The solid propellant rocket motor of claim 7 wherein the solid propellant filling said cavity within said forward end section has a burning rate between about 2 to about 25 times greater than the burning rate of said base propellant and said aft end section includes at least one substantially radial slot extending from said central cavity into the base propellant of said aft end section.

* * * * *